Nov. 3, 1925.
J. H. BARNES
GASOLINE GAUGE
Filed Sept. 8, 1924
1,560,461
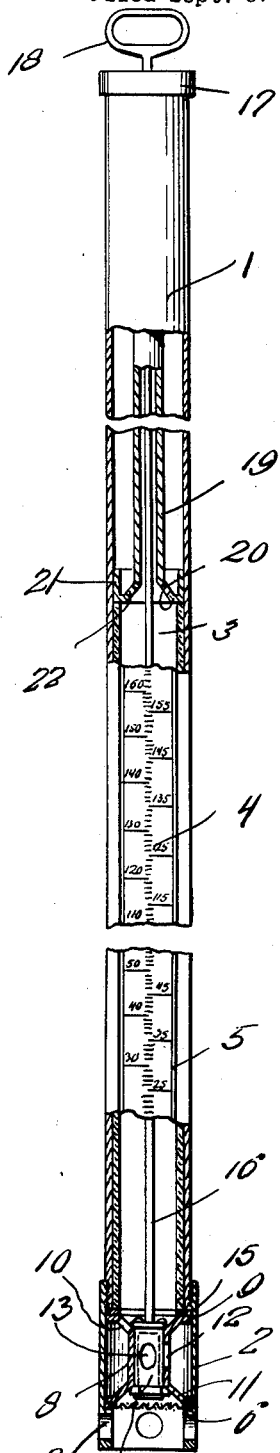
J. H. Barnes,
Inventor
By Clarence A. O'Brien
Attorney Patented Nov. 3, 1925.

1,560,461

UNITED STATES PATENT OFFICE.

JAHNEY H. BARNES, OF EUREKA, KANSAS.

GASOLINE GAUGE.

Application filed September 8, 1924. Serial No. 736,559.

*To all whom it may concern:*

Be it known that I, JAHNEY H. BARNES, a citizen of the United States, residing at Eureka, in the county of Greenwood and State of Kansas, have invented certain new and useful Improvements in Gasoline Gauges, of which the following is a specification.

This invention relates to improvements in gasoline gauges, and has for its principal object to provide a simple and efficient means for accurately ascertaining the amount of gasoline in a tank.

With the gasoline gauges, the same comprising wooden sticks having graduations thereon, when the same is inserted into a gasoline tank, the gasoline has a tendency to creep upwardly on the stick, and thereby prevent a person from accurately ascertaining the exact amount of gasoline in the tank.

Another object of the invention is to provide a gasoline gauge of the above mentioned character, which is adapted to be inserted into a gasoline tank, means being provided for receiving an amount of gasoline which is indicative of the amount of gasoline in the tank, means being further provided for preventing the gasoline within the gauge from being discharged therefrom before the same has been removed from the tank and inspected.

A further object of the invention is to provide a gasoline gauge of the above mentioned character, which is simple in construction, inexpensive, strong, and durable, and further well adapted for the purpose for which it is designated.

Other objects and advantages of this invention will become apparent during the course of the following description.

In the accompanying drawing, forming a part of this specification, and in which like numerals designate like parts throughout the same:

The figure is a view partly in side elevation and partly in section of the gasoline gauge, embodying my invention.

In the drawing, wherein for the purpose of illustration is shown the preferred embodiment of my invention, the numeral 1 designates an elongated cylindrical casing, which is preferably formed of metal, and the respective ends thereof are open. The lower end of the casing is externally threaded, and provides a means for supporting thereon the hollow head 2. The purpose of the head will be hereinafter more fully described. Supported in the outer portion of the cylindrical casing is a glass tube, in which is adapted to enter a quantity of gasoline from that which is contained within the tank in which the gauge is placed. The glass tube has provided on the outer face thereof the graduation designated generally by the numeral 4, whereby the exact amount of gasoline within the casing may be readily determined. For the purpose of rendering the graduations visible, the casing 1 is provided with a flat cut out portion 5, the same extending for substantially the full length of the glass tube.

Supported in the hollow head 2 between the lower end of the casing and the glass tube, and the annular shoulder formed on the inner wall of the head directly above the inlet openings 7 is the sleeve or barrel 8. The upper portion of the barrel is flared outwardly as illustrated at 9, and arranged in the flared portion 9 are the outlet openings 10, which form a communication between the heads 2 and the glass tube 3 for the purposes hereinafter to be more fully described. The lower portion of the sleeve 8 is also flared, as is illustrated at 11, whereby means is provided for supporting the same in engagement with the shoulder 6. An opening 12 is provided in the sleeve or barrel 8, and adapted for cooperation therewith is the opening 13 formed in the barrel 14, which is mounted in the sleeve, and is of the hollow type, whereby the same communicates with the lower portion of the hollow head to be presently described.

A filter screen 14 is disposed between the lower flared end of the sleeve 8, and the shoulder 6, for preventing any foreign substance from entering the valve 14 and the glass tube 3. A gasket 15 is interposed between the upper flared end 9 of the sleeve 8, and the lower edges of the cylindrical casing and the glass tube respectively, in the manner indicated.

An actuating rod for the valve 14 is shown at 16, and the same extends upwardly through the glass tube 3, and the upper portion of the metallic casing 1, as well as through the cap 17 provided on the upper end of the casing, and terminates in the handle portion 18.

A guide means for the upper portion of the valve actuating rod 16 is shown at 19, and the same comprises an elongated tubular sleeve, the lower end of which is flared outwardly, as illustrated at 20, and terminates in the flange 21, which is adapted to rest on the upper edge of the glass tube 3, the upper end of the guide sleeve terminating adjacent the upper end of the casing 1. Air holes, such as are shown at 22, are provided in the flared portion 20.

The use of my improved gasoline gauge may be briefly stated as follows:

The valve 14 is initially actuated so that the opening 13 in the side thereof will communicate with the opening 12 in the sleeve 8. The gauge is then inserted into the tank of gasoline, in such a manner as to have the control end of the head 2 resting on the bottom of the tank. The gasoline in the tank will then flow through the inlet opening 7 into the hollow valve 14, and out through the registering openings 13 and 12 into the hollow head. The gasoline will then flow upwardly through the outlet opening 10 into the glass tube 3, until the level of the gasoline in the glass tube is equivalent to the level of the gasoline in the tank, in which the gauge is inserted. The handle 18 is then turned so as to close the valve 14, moving the lateral opening 13 in the valve out of registery with the opening 12 and trapping the gasoline within the glass tube. The gauge is then removed from the tank and upon inspecting the tube through the opening or cut away portion 5 of the casing, the amount of gasoline contained within the tank may be readily ascertained. The gasoline within the tube 3 may be discharged therefrom back into the tank by opening the valve 14, it being understood, of course, that the gauge is disposed near the opening in the tank.

The provision of a gasoline gauge of the above mentioned character will enable a person to accurately ascertain the exact amount of gasoline within the tank, and the simplicity with which the present device is constructed enables the same to be easily and efficiently operated.

While I have shown the preferred embodiment of my invention, it is to be understood that various changes in the size, shape, and arrangement of parts, may be resorted to, without departing from the spirit of the invention, and the scope of the appended claim.

Having thus described my invention, what I claim is:

In a gasoline gauge, an elongated cylindrical casing, valve means on one end thereof, a cap on the other end thereof, a glass tube in the casing extending from an intermediate portion thereof to the valve means at one end thereof, said casing provided with an opening extending the approximate length of the tube, an actuating rod associated with the valve means and extending through the casing and through the cap thereof, a handle on the end of the actuating rod adjacent the cap, a tubular sleeve in the casing extending downwardly from the cap and terminating at its bottom end in a flared portion merging into an upwardly disposed annular flange adapted to rest on the tube.

In testimony whereof I affix my signature.

JAHNEY H. BARNES.